United States Patent Office 3,145,582
Patented Aug. 25, 1964

3,145,582
POSITIONABLE BREATHER FOR A GEAR CASE
Robert W. Wagner, Chelsea, Mich., assignor to Dana Corporation, Toledo, Ohio, a corporation of Virginia
Filed July 14, 1961, Ser. No. 124,218
3 Claims. (Cl. 74—606)

This application relates to gear boxes in general, and more specifically to vent or breather means for gear boxes.

It is well known in the art that gear box, for instance a power-take-off case, must be provided with a breather to operate properly. The breather is provided to allow free entrance and exit of gas pressure to the gear case. This is very essential with respect to a gear case which is supplied with a lubricant; for example, as the temperature increases so does the vapor pressure of the lubricant and the pressure of the gas within the case. If this pressure within the case is not relieved, oil will be forced out of the case past whatever sealing means are present therein.

The breather, then, of necessity must be positioned above the level of the lubricant so that the gas pressure may be expelled from the case without expelling the lubricant. If the breather is below the level of the lubricant or positioned whereby the lubricant is splashed or foamed thereon, as the pressure within the unit increases, the lubricant will be forced out of the breather instead of the gas entrapped in the case.

No particular problem arises when a transmission or power-take-off case is adapted for mounting in one position only, for then it is relatively easy to select a position for the breather which is satisfactory for operating conditions. However, with respect to gear boxes which may be mounted in more than one position, a problem arises in that a particular location selected for a breather hole may be proper in one position of the gear box yet improper in another position.

The prior art method of providing for such multiple positioned gear cases is to provide a plurality of locations on the case for mounting the breather. The locations which are not used are plugged so that lubricant does not leak therefrom. In this manner for any selected position of the case the proper breather location is used. This results in a great increase in machining costs, and also requires that the transmission case be adapted with a plurality of locations to receive the vent or breather.

It is therefore an object of this invention to provide a simple and inexpensive means for positioning a breather on a gear case, which is adapted for mounting in a plurality of positions.

It is another object of this invention to provide means for insuring that the breather or vent is always positioned in a location which is satisfactory for the operating requirements of a gear case.

It is a further object of this invention to provide means for positioning a breather which is easy to manufacture, simple to adjust, operates efficiently, and results in a reduction of the cost of the final assembly.

Further and more specific objects and advantages of this invention will be readily apparent from the following description when considered with the accompanying illustrations wherein.

In one preferred embodiment, this invention is accommodated in a split shaft power-take-off unit. This unit is adapted to be positioned in the drive line of a vehicle and has an input shaft with gear and clutch means provided thereon whereby the input shaft may be coupled to an aligned output shaft for driving the wheel mechanisms of the vehicle or alternately the input shaft may be coupled to a power-take-off shaft positioned parallel to the input shaft. Because of the wide variety of vehicles that employ such a unit, it must be quite versatile; that is, it must be able to operate in a plurality of positions, for instance on the top of the main transmission or on the side thereof, so that it does not interfere with various other parts of the vehicle. For this reason, the major axis of the unit may assume a multitude of positions from horizontal to vertical.

Since the unit must be adapted for a plurality of positions, a single breather or vent location is not acceptable since it is suitable only for relatively few of the many positions of the unit. To provide a simple means for adjustably positioning the breather, the breather has been provided eccentrically in the bearing cap for the power-take-off shaft. Further, this bearing cap is constructed so that it may be rotated and attached to the case in a plurality of positions. Each position of the cap will dispose the breather in a different location relative to the gear case, so that its position relative to the lubricant level within the gear case may be adjusted to operate satisfactorily for a plurality of positions of the gear case.

Figure 1:
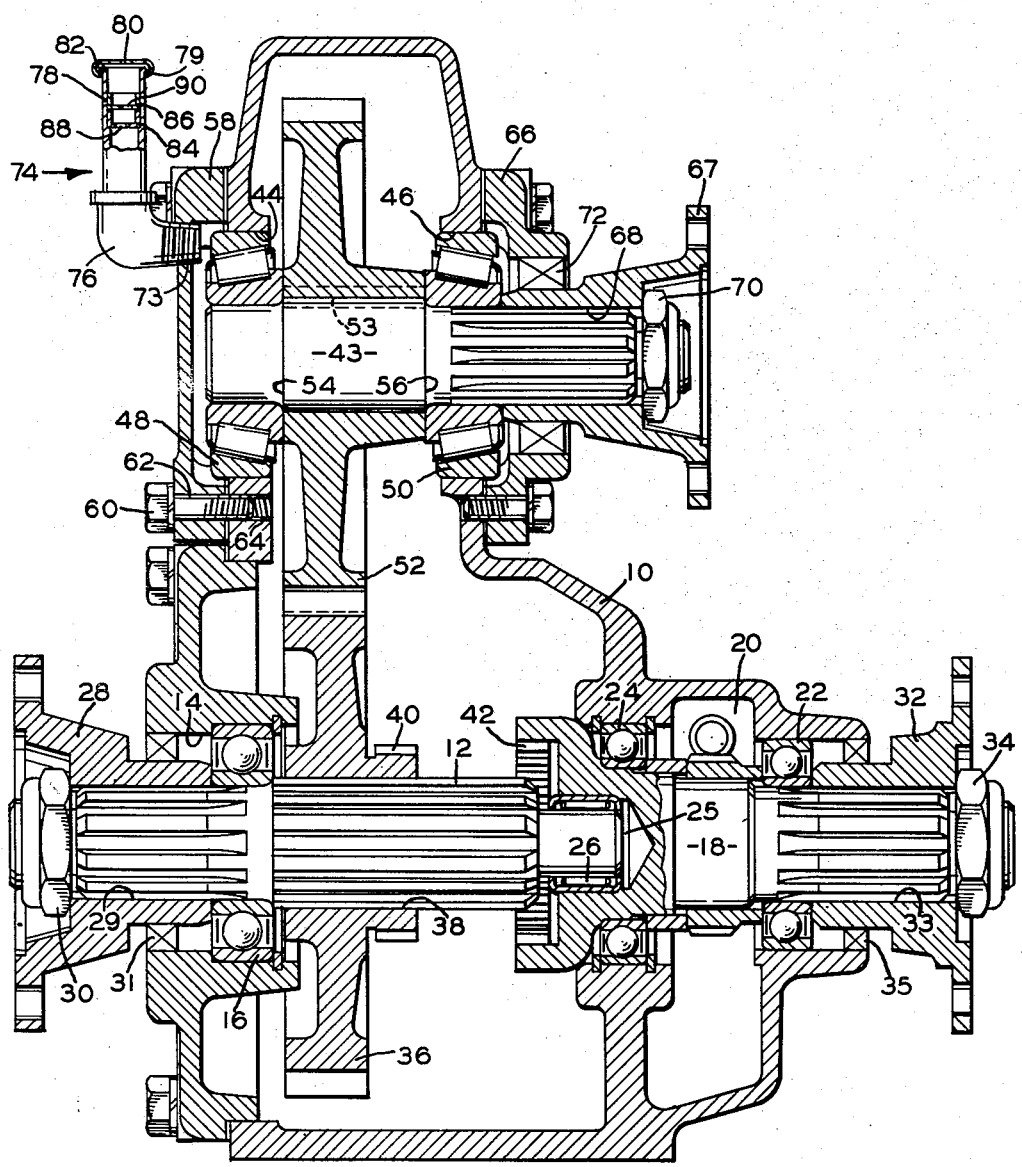
FIG. 1 is a cross sectional view of a split shaft power-take-off unit embodying this invention.

Referring now to the drawings and more particularly to FIG. 1, the case of a split-shaft power-take-off unit is shown at 10. An axially extending input shaft 12 is received in an opening 14 in the gear case and mounted for rotation therein by a bearing 16. The shaft 12 is normally positioned in the drive train of a vehicle and driven by the output from the transmission (not shown). An output shaft 18, aligned with shaft 12, is received in a second opening 20 in the gear case 10 and is mounted for rotation therein by bearings 22 and 24. The output shaft 18 is provided with a bore 25 at its inboard end wherein the inboard end of input shaft 12 is supported for rotation by means of pocket bearings 26.

The outboard end of input shaft 12 is provided with a flange 28 which is splined thereon as shown generally at 29 and fixedly attached thereto by means of a nut 30. The flange 28 serves as the means of attaching the shaft 12 to the drive line of the vehicle (not shown). Interposed between the flange 28 and the case 10 is a seal 31 which prevents the escape of lubricant. The outboard end of the output shaft 18 is provided with a flange 32 which is splined thereon, as shown generally at 33, and fixedly secured thereto by nut 34. The flange 32 serves as a means for attaching the output shaft 18 to the drive line of the vehicle (not shown). Interposed between the flange 32 and the case is a seal 35 which prevents the escape of lubricant.

An input gear 36 is mounted on input shaft 12 for rotation therewith by a spline engagement shown generally at 38. The gear 36 is movable axially relative to the shaft 12 and is provided with external clutching teeth 40 which are adapted for engagement with internal clutching teeth 42 provided on the inboard end of output shaft 18.

By moving the input gear 36 axially to the right on shaft 12 into engagement with the internal clutching teeth 42 of the output shaft 18, the input shaft 12 and output shaft 18 will be drivingly connected.

A second output shaft 43, the power-take-off shaft, is disposed parallel to the input shaft 12 and received in axially extending openings 44 and 46 provided in the case 10. The power-take-off shaft 43 is rotatably mounted in case 10 by means of bearings 48 and 50 in the openings 44 and 46 respectively. A power-take-off gear 52 is mounted on the power-take-off shaft for rotation therewith by means of a key 53. The power-take-off gear 52 is provided with gear teeth thereon, which are adapted for engagement with the teeth on input gear 36. When the gear 36 is shifted axially to the left relative to the input shaft 12 and engages gear 52, the direct drive connection between the input shaft 12 and output shaft 18 is terminated and the power-take-off output shaft 43 is drivingly connected to the input shaft 12.

The bearings 48 and 50 which rotatably mount the power-take-off shaft, are fixedly positioned relative to the gear case 10. More specifically, the power-take-off shaft is provided with shoulders 54 and 56 which are in abutting engagement respectively with the bearings 48 and 50 and prevent inward movement thereof. A first bearing cap 58 abuttingly engages the bearing 48 and prevents outward movement thereof. The bearing cap 58 is fixedly attached to the case 10 by means of a plurality of cap screws 60 which pass through openings 62 in the cap 58 and are threadedly received in openings 64 in the case 10.

The output end of the power-take-off shaft is surrounded by a bearing cap 66 which cap is suitably secured to the case 10 and abuttingly engages the outside of the bearing 50 and prevents outward movement thereof. A power-take-off flange 67 is mounted for rotation with the power-take-off shaft as by a spline engagement shown generally at 68, and fixedly attached thereto by nut 70. The means to be driven by the power-take-off unit are attached to the flange 67 in a suitable manner. A seal 72 is positioned between the bearing cap 66 and the flange 67 to prevent lubricant from leaking therebetween.

Threadedly received in an eccentrically positioned opening 73 in the bearing cap 58 is a breather assembly shown generally at 74. More specifically, the breather assembly 74 comprises an elbow 76 which extends upright as shown in FIG. 1. Threadedly received in the elbow 76 is a stand pipe 78. The top of the stand pipe 78 is flared outwardly and receives a bent-in flange 79 of a breather cap 80 which is disposed on top of the stand pipe 78. The breather cap 80 is received on the stand pipe 78 in a loosely engaging manner so that gas may escape from passageway 82 between the breather cap 80 and the stand pipe 78. Internally, the stand pipe 78 is provided with a pair of baffle plates 84 and 86 which have provided therein, respectively, openings 88 and 90. The openings 88 and 90 are misaligned, and are provided to collect any lubricant spray which may enter the breather and cause it to return to the case 10 while allowing the gas to escape from the breather 74.

Figure 2:
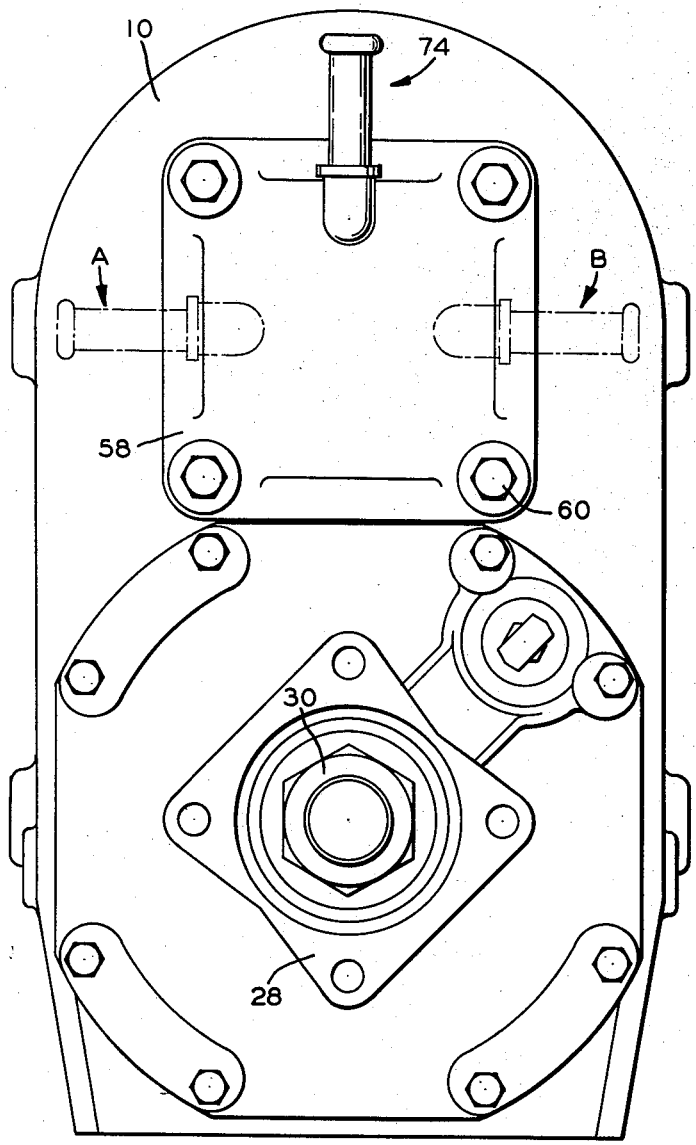
FIG. 2 is an end view of the power-take-off shown in FIG. 1 showing the means for positioning the breather in a plurality of positions.

Referring now to FIG. 2, it is apparent that the bearing cap 58 is symmetrical, and is attached to the case 10 by the four bolts 60. The breather 74 is positioned in the bearing cap 58 in such a manner as to be disposed eccentrically; i.e., intermediate its center and periphery. It is apparent that by removing the bolts 60 the bearing cap 58 may be moved to different positions. If the bearing cap 58 is rotated 90° in a counterclockwise direction, the breather cap will be positioned as shown in phantom at A. If the bearing cap 58 is rotated 90° in a clockwise direction, then the breather will occupy a position as shown in phantom at B. It is apparent, then, that if the power-take-off case 10 is mounted in a vehicle so as to be in an upright position as shown in FIG. 2, then the bearing cap 58 should be attached thereto so that the breather 74 is extending upright as shown in solid lines. If the power-take-off case 10 is rotated about the shaft 12 and is mounted with the right side of the case as viewed in FIG. 2 in its lowest substantially horizontal position then the bearing cap 58 should be rotated so that the breather occupies position A. Further, if the power-take-off unit 10 is rotated about the shaft 12 and is mounted so that the left side of the unit is in its lowest substantially horizontal position, then the bearing cap 58 should be rotated so that the breather occupies position B. In this manner the breather 74 will always be well above the level of the lubricant contained within the case 10 and therefore in operation merely gas and no lubricant will be expelled therefrom.

From the foregoing, it is apparent that a simple means has been provided for the multiple positioning of a breather on a gear case, which breather can always be positioned in a location which is satisfactory for the operating requirements of the case, and which is easy to manufacture, simple to adjust and results in a reduction of cost.

The preferred embodiment of this invention has been shown and described, but changes and modifications can be made, and it is understood that this description is illustrative only and not for the purpose of rendering this invention limited to the details illustrated or described except insofar as they have been limited by the terms of the following claims.

What is claimed is:

1. The combination with a transmission having a housing with an axially extending axis and being rotatable about said axis to assume a plurality of operative positions and having lubricant therein the level of which assumes various positions as said housing is rotated about said axis and having an axially extending opening therein at least a portion of which is adapted to be maintained above the lubricant level when said housing is in its various positions, of cover means for said opening, breather means positioned eccentrically in said cover means, symmetrically arranged attaching means for attaching said cover means to said housing for covering the opening therein, said cover means being adapted to be rotated and attached to said case in a plurality of positions whereby said breather means may be positioned in a plurality of positions relative to said case and disposed above the lubricant level.

2. The combination with a transmission having a housing with an axially extending axis and being rotatable about said axis to assume a plurality of operative positions and having lubricant therein the level of which assumes various positions as said housing is rotated about said axis and having an axially extending opening therein at least a portion of which is adapted to be maintained above the lubricant level when said housing is in its various positions, of cover means for said opening having a first plurality of symmetrically positioned attaching means, a second plurality of symmetrically positioned attaching means carried by said case adjacent the opening therein and adapted to cooperate with said first attaching means, breather means attached to said cover means intermediate the center and the periphery thereof, means interconnecting the attaching means of said gear case and cover means, said cover means being adapted to be moved whereby various of its attaching means are aligned with various attaching means of said case, whereby said breather means may be positioned in a plurality of positions relative to said case and disposed above the lubricant level.

3. The combination with a transmission having a housing with an axially extending axis and being rotatable about said axis to assume a plurality of operative positions and having lubricant therein the level of which assumes various positions as said housing is rotated about said axis and having an axially extending opening therein at least a portion of which is adapted to be maintained above the lubricant level when said housing is in its various positions, of cover means for said opening, symmetrically arranged attaching means for attaching said cover means to said case for covering the opening therein, said means being adapted to be rotated and attached to said case in a plurality of positions, said cover means having an opening extending axially therethrough which opening is positioned intermediate the center and periphery of said cover and displaced sufficiently from the center of said cover to be positionable above the level of the lubricant, and breather means disposed in the opening in said cover whereby said breather means may be positioned in a plurality of positions relative to said case and disposed above the lubricant level when said case is disposed in its plurality of operative positions.

References Cited in the file of this patent
UNITED STATES PATENTS 2,145,545     Johnson et al.            Jan. 31, 1939

UNITED STATES PATENT OFFICE
CERTIFICATE OF CORRECTION

Patent No. 3,145,582

August 25, 1964

Robert W. Wagner

It is hereby certified that error appears in the above numbered patent requiring correction and that the said Letters Patent should read as corrected below.

Column 1, line 10, after "that" insert -- a --; column 5, line 4, after "therein, said" insert -- cover --.

Signed and sealed this 22nd day of December 1964.

(SEAL)
Attest:

ERNEST W. SWIDER
Attesting Officer

EDWARD J. BRENNER
Commissioner of Patents